US010688664B2

(12) United States Patent
Kovacs

(10) Patent No.: US 10,688,664 B2
(45) Date of Patent: Jun. 23, 2020

(54) ARRANGEMENT AND METHOD FOR THE MODEL-BASED CALIBRATION OF A ROBOT IN A WORKING SPACE

(71) Applicant: Peter Kovacs, Berlin (DE)

(72) Inventor: Peter Kovacs, Berlin (DE)

(73) Assignee: Peter Kovacs, Berlin (DE)

( * ) Notice: Subject to any disclaimer, the term of this patent is extended or adjusted under 35 U.S.C. 154(b) by 174 days.

(21) Appl. No.: 15/671,215

(22) Filed: Aug. 8, 2017

(65) Prior Publication Data

US 2017/0334072 A1     Nov. 23, 2017

Related U.S. Application Data

(63) Continuation of application No. 14/625,643, filed on Feb. 19, 2015, now abandoned.

(51) Int. Cl.
*B25J 9/16*     (2006.01)
*G01B 11/00*    (2006.01)
*G01S 5/16*     (2006.01)

(52) U.S. Cl.
CPC ............. *B25J 9/1692* (2013.01); *G01B 11/00* (2013.01); *G01S 5/163* (2013.01); *G05B 2219/39024* (2013.01); *G05B 2219/39031* (2013.01); *G05B 2219/40613* (2013.01); *G05B 2219/40623* (2013.01)

(58) Field of Classification Search
CPC ........ B25J 9/1692; G01B 11/00; G01S 5/163; G05B 2219/40623; G05B 2219/40613; G05B 2219/39024; G05B 2219/39031
See application file for complete search history.

(56) References Cited

U.S. PATENT DOCUMENTS

| 6,101,455 A | 8/2000 | Davis | |
|---|---|---|---|
| 6,529,852 B2 | 3/2003 | Knoll | |
| 2003/0120377 A1* | 6/2003 | Hooke | B23Q 9/00 700/195 |

(Continued)

FOREIGN PATENT DOCUMENTS

| DE | 202005010299 U1 | 1/2006 |
|---|---|---|
| DE | 102012016106 A1 | 2/2014 |

(Continued)

OTHER PUBLICATIONS

Final Office Action dated Feb. 10, 2017 (attached) for the parent U.S. Appl. No. 14/625,643.

*Primary Examiner* — Adam R Mott

(57) ABSTRACT

An arrangement for the model-based calibration of a mechanism in a workspace with calibration objects that are either directed laser radiation patterns together with an associated laser radiation-pattern generator or radiation-pattern position sensors. Functional operation groups made up of at least one laser radiation pattern and at least one position sensor interact in such a way when a radiation pattern impinges on the sensor that measured sensor position information values are passed along to computing devices that determine the parameters of a mathematical mechanism model with the aid of these measured values. In the process, at least two different functional operation groups are used to calibrate the mechanism, and at least two calibration objects from different functional operation groups are rigidly connected to one another.

13 Claims, 5 Drawing Sheets

(56) References Cited

U.S. PATENT DOCUMENTS

2009/0157226 A1* 6/2009 de Smet ................ B25J 9/1692
　　　　　　　　　　　　　　　　　　　　　　700/254

FOREIGN PATENT DOCUMENTS

| FR | 2729236 A1 | 7/1996 |
| WO | 2010/094949 A1 | 8/2010 |
| WO | 2013/091596 A9 | 6/2013 |

* cited by examiner

ARRANGEMENT AND METHOD FOR THE MODEL-BASED CALIBRATION OF A ROBOT IN A WORKING SPACE

CROSS REFERENCE TO RELATED APPLICATIONS

This application is a continuation of U.S. Ser. No. 14/625,643 filed on Feb. 19, 2015, which is incorporated by reference herein in its entirety.

BACKGROUND

This invention relates to an arrangement for the model-based calibration of a robot in a workspace with at least three calibration objects that are either designed to be directed radiation patterns together with associated radiation-pattern generators or radiation-pattern position sensors; when a radiation pattern is encountered, position sensors pass measured values with position information along to the computing devices, which determine the parameters of a mathematical mechanism model with the aid of these measured values.

An arrangement of this type and a method of this type are known to the public from the prior art. First off, fundamental terms will be defined:
1. Mechanism: A mechanism is a system of so-called segments or rigid bodies that are connected to one another via revolute joints, sliding joints or screw joints. Examples are robots, gantries, machine tools or hexapods.
2. Robot: To simplify the understanding of this invention, the term robot 1 will be used as a synonym for the term mechanism below.
3. Effector, or more specifically hand or tool: is a segment of the mechanism that a work object (e.g. grippers (with a workpiece), a milling tool, a camera etc.) can be mounted on for the purpose of carrying out a useful activity. The aim of the invention is to precisely position the effector with the work object in the workspace or relative to the robot base.
4. Pose: describes in a summary fashion the position and orientation of an object in the 3-dimensional ordinary space.
5. Joint configuration: is the totality of all of the positioning values of the joints of a robot that determine the position of all of the robot segments or rigid bodies vis-a-vis one another including the effector.

The robot is customarily calibrated in advance, i.e. all of the parameters of a mathematical robot model that have an influence on the precision of the effector pose are exactly identified, so that the robot can be precisely controlled in the overall workspace. According to Schröer [Schröer], model-based robot calibration consists of three basic steps in principle:

measurements are performed that provide information on the effector pose of a robot to be calibrated in the workspace;
the measured values that are obtained and the accompanying joint configurations of the robot are correlated with one another via equations for each measurement;
the parameters of a mathematical model of the robot and the pose of the participating calibration objects are calculated from the totality of the equations that are obtained by mathematical methods of parameter identification, for instance by Gauss-Newton methods or Levenberg-Marquardt methods.

Calibration systems are essentially distinguished by the measurement equipment that is used and the mathematical mechanism model and the mathematical parameter identification algorithms that are used as a basis in each case.

The following terminology definitions will facilitate the entire remaining description:
6. A laser radiation-pattern generator produces directed electromagnetic radiation or directed radiation patterns, for instance individual beams or bundles of isolated individual beams or line-shaped or cross-shaped radiation patterns 9 or any other directed radiation patterns.
7. Laser: For the purposes of simplification, the term laser will be used as a synonym for radiation-pattern generator below.
8. Laser radiation-pattern position sensors can precisely determine the position and orientation, if applicable, of an incident radiation pattern relative to a coordinate system permanently assigned to the sensor. For the purposes of simplification, the term sensor will be used as a synonym for radiation-pattern position sensor below.
9. A calibration object is to be understood to be a generic term for sensors and radiation patterns together with the associated laser in this description. Connected images of radiation patterns on the sensor surface, such as points, lines or crosses, will be considered to be a single calibration object. Unconnected radiation patterns that are generated by a laser, for instance via splitting optics, are considered to be several different calibration objects.
10. A calibration object pair is defined as a connected radiation pattern together with an associated laser and a sensor; one calibration object is attached to the robot effector ["effector object"], and one is stationary in the space [reference object].
11. Laser sensor systems are robot calibration systems that are based on the following principle: A calibration object of a calibration object pair is mounted on the effector and designated as an effector object below. The other calibration object of the pair is positioned in a stationary fashion in or close to the workspace and is designated as a reference object below. The robot moves the effector object into a multitude of poses in which at least one radiation pattern of the laser hits the sensor. The sensor passes the measured values along to the computing unit, which computes the exact parameters of a mathematical mechanism model from the measured values and the associated joint configurations. Calibration object pairs can change in the course of a mechanism calibration or, more precisely: Each laser can irradiate different sensors, and each sensor is irradiated by different radiation patterns.
12. The term initial estimation denominates the initial rough calibration of the calibration objects; see also the notes on FIG. 5 with regard to this. The calibration objects have to be installed—i.e. positioned and mounted—on the robot and in its workcell in practice, and their pose relative to the robot is frequently not exactly known after installation. Before the actual calibration, the poses of the calibration objects have to be determined with sufficient accuracy relative to the robot flange and the robot base in order to generate measurement poses where the laser beams hit the measurement poses of the sensors. The initial, approximate determination of the poses of the calibration objects relative to the robot is called the initial estimation here. Fully automatic initial estimation is difficult from a technical point of view and elaborate in view of the required algorithms and the amount of time required.

13. A functional operation group is a minimal group of calibration objects that fulfill an essential, independent and precisely definable technical function in the process of calibration with laser-sensor systems. The requirement of minimality refers to the number of calibration objects that are involved and means: If one of the calibration objects is removed, the particular functional effect of the group can no longer be fulfilled.

The most elemental, most simple example of a functional operation group is a customary calibration object pair that is used in the fundamental sense of the instant document or by [P1]. The functional effect involves the collection of measured data in the sense of the fundamental measurement principle here. The characteristic of minimality is fulfilled because the removal of one of the two calibration objects destroys the capability to collect measured data.

A second, important example of a functional operation group is a length standard or etalon as in FIG. 2, for instance, comprised of a laser on the effector and at least two sensors that are mounted at a defined distance on a stationary support unit in accordance with [P1]. No absolute lengths (of robot-arm segments) or distances can be determined via laser-sensor systems at all without a length standard. Length standards consequently have an essential, independent function in the calibration via laser-sensor systems.

FIG. 5 shows, as an example, two functional operation groups: The laser with the sensor that is being hit at the moment constitutes one operation group. The other group is made up of the two other components or calibration objects in FIG. 5. In certain poses, both of them can perform measurements that are synchronous in time.

In FIG. 1, there are four functional operation groups that belong to the sensor that is being irradiated at the moment (formed by the sensor with one of the four laser beams in each case). They can almost always perform simultaneous measurements due to the arrangement. Note that four other functional operation groups belong to this arrangement, namely the same four laser beams that potentially interact with the other sensor in FIG. 1 that is not receiving radiation at the moment.

Of course, it is also possible to rigidly combine several functional operation groups of arbitrary types. E.g. if a rigidly connected isosceles triangle is created from three identical length standards with two sensors each and there is one laser on the effector, as an example, then six elementary functional operation groups are obtained. But six sensors are superfluous—the three sensor pairs at the three connection points in each case can be consolidated or conceptually merged into a single sensor in each case. This results in three functional operation groups with a total of three sensors. Each of the operation groups is a length standard in and of itself! The three length standards are rigidly connected to one another, and each of the total of three sensors belongs to two different length standards in this case.

In the arrangement in FIG. 4, the objects involved in accordance with the definition of the functional operation groups are not
1. two operation groups with one sensor each and a number of rigidly connected radiation patterns.

Rather, this involves
2. a number of elementary functional operation groups with one sensor and one radiation pattern or laser beam each.

Only the second interpretation meets the definition of functional operation groups because
the combination of two or more laser beams does not fulfill an "essential, independent function" here. All of the beams, aside from one (arbitrary) beam, can be removed from every rigid combination of two or more laser beams without any problems, and the robot can then be calibrated. One only has to make a greater effort and record more measurements, or mount the one laser in other positions on the flange, to get to a comparable calibration result, i.e. only the advantages claimed in this document are lost.
In addition, the requirement of minimality is only fulfilled in the second interpretation.

The fundamentals of laser-sensor methods for industrial use are presented in [P1]. This document is based on [P1] without being limited in its scope by [P1]. The rigid combination of calibration objects in accordance with claim 1 increases the efficiency or benefits of the calibration via laser-sensor systems in different ways. The benefits that result from the rigid combination of calibration objects of various functional operation groups have not been described in any earlier document.

Two methods, among others, for including a length standard or scalar factor in the calibration are presented in a scientific article [Gatla]. The article does not contain any advances vis-a-vis [P1]. The device that is favored in the end moves the robot on a mobile frame by a precise, defined offset, which has little suitability for industrial uses in general. In a second proposal, a rigid combination of lasers and sensors is exclusively investigated for the purpose of determining a scalar factor—thus, the device involves a single length standard or a single functional operation group that is an practically unsuitable variant of the principle from [P1]. The variant in [Gatla] is immediately rejected by the authors because it would lead to a substantial amplification of errors in practice.

[P2] involves a method for measuring the current, specific pose of the effector in each case, in contrast to the calibration of a robot or the identification of the "parameters of a mathematical mechanism model". The purpose, objectives and method of operation of [P2] are fundamentally different than those of this document. A closer look at [P2] sheds some light on a few of the advantages of the instant invention and concepts, however. If the concept of the functional operation group is applied to effector measurement systems, [P2] involves a system with a single operation group, in so far as a SINGLE "motif lumineux" or a SINGLE "ensemble de taches lumineux" is used here. This document and [P2] are also diametrically opposed to one another with regard to the crucial effect. With a practical realization of [P2], minor measurement errors and minor identification errors can be expected, as is the case with every measurement device, in the determination of the position of the laser beams vis-a-vis one another. The method in [P2] amplifies errors to an extreme degree due to the forced parallelism of the laser beams: If the lasers (motif lumineux) in [P2] are perpendicular over the receiver field (champ de capteur) at a distance of d=1000 mm and if the laser beams are a=30 mm apart from one another and if the overall error (measurement and identification errors) is f=0.01 mm, the resulting error in determining the position is 25.81 mm (=d*arccos(a/(a+f)); thus, the error is amplified by a factor of 2581. The greater the receiver-effector distance, the poorer the determination of the position by [P2]. With an identical implementation, the following will apply to the instant document because of the completely different method of operation: The greater the distance, the better the determination of angles in the robot! To get to the point with regard to the difference, the same measurement that determines a given position with 2500-fold error amplification in accordance with [P2] makes a crucial contribution to the highly precise calibration of the mechanism in accordance with the instant document. The drawbacks of [P2] correspond to the advantages of this invention! One of the objects of this document is to exceed current peak values in robot calibration in the mean-error range of approximately 0.1 to 0.3 mm by a few $\frac{1}{100}$ millimeters with an economical apparatus or, as the case may be, to achieve peak results that are more efficient than in the past in terms of accuracy, time consumption and costs.

[P3] and the preceding patents quoted there use stationary sensors and effector-object lasers to derive information about the pose of the effector in various ways over several steps. This device does not serve to calibrate robots either, but instead to measure isolated effector poses. The purpose, aims and method of operation differ from those of this document. The method provides a mathematically proven amplification of errors by a factor of 12 to 13 for a typical industrial robot under optimal conditions. The method, to the extent known, is not used in industry.

Laser sensor pairs are not used for calibration in [P4]. As far as that is concerned, the features of the inventions are different right from the outset. Even if the ball and camera pair from [P4] were equated in some sense with a laser and a sensor, a single functional operation group would be involved as, in particular, none of the cameras could be removed without destroying the functionality of the process.

Laser sensor pairs are not used for measurements in [P5]. As far as that is concerned, the features of the inventions are different right from the outset. Even if cameras and the passive reference objects that are photographed are equated in some sense with lasers and sensors, the apparatus serves to determine the relationship between several cameras and the base of the robot. The concept of calibration is used in the sense of so-called hand-eye coordination here. The objective is not to increase the positioning accuracy of the robot via calibration, but instead to identify the pose of objects or of workpieces relative to the robot via one or more cameras ["accurate machine-workpiece measurements", "eliminate workpiece pose inaccuracies"]. If a distinction is made between the actual useful production activity of the robot and the calibration process, the cameras in [P5] are used for the precise gripping of objects during the useful production activity of the robot. The mounting positions of the various cameras are determined by the useful activity; they are specified in [P5]. The concept of functional operation groups is not applicable to objects that are predetermined by the useful production activity. In contrast to [P5], the calibration objects in the document in hand are exclusively used for the calibration process, they are part of the apparatus being claimed here or are dependent upon [P1], and their poses are exclusively determined based on considerations involving the calibration process. The advantages of the rigid combination of calibration objects that are crucial for the instant invention are not described in [P5].

The drawbacks of previous laser-sensor methods for the model-based calibration of robots are, above all:
  They provide little information per measurement and require too many time-consuming measurements for critical applications, for instance so-called temperature compensation;
  The average pose accuracy of the calibrated robot remains low in the overall workspace because of the use of a single calibration object pair. When more than two calibration objects are used, in contrast, the number of parameters to be identified increases because the poses of all of the calibration objects have to be precisely determined without fail, which likewise decreases the resulting effector-pose accuracy of the calibrated mechanism;
  The installation of several calibration objects on the robot and in the workspace of the robot for the purpose of laser-sensor calibration is complex and requires experience.
  The initial estimation of several calibration objects is technically complex and time-consuming:
  The clearance in the workcell that is required for calibration is large.

SUMMARY

The invention relates to an arrangement for the model-based calibration of a mechanism in a workspace with calibration objects that are either directed laser radiation patterns together with an associated laser radiation-pattern generator or radiation-pattern position sensors. Functional operation groups made up of at least one laser radiation pattern and at least one position sensor interact in such a way when a radiation pattern impinges on the sensor that measured sensor position information values are passed along to computing devices that determine the parameters of a mathematical mechanism model with the aid of these measured values. In the process, at least two different functional operation groups are used to calibrate the mechanism, and at least two calibration objects from different functional operation groups are rigidly connected to one another.

DETAILED DESCRIPTION

The object of this invention is to therefore provide a further development of an arrangement and a method of the type described at the outset that eliminates the above-mentioned drawbacks. The problem is solved as per the invention by having at least two calibration objects taken from different functional operation groups rigidly connected to one another.

The crucial advantage of this rigid connection is a maximum increase in the information or efficiency per measurement as follows: The impact point of a laser beam on a sensor of a laser-sensor system provides, in accordance with [P1], two equations for the parameter identification: one each for the x and y coordinates of the impact point in the sensor coordinate system. In contrast, the four rigidly connected beams of the example in FIG. 1, for instance, provide 4*2=8 equations per measurement. Two of them are dependent upon the remaining six and provide important redundant information. Six independent equations are the maximum amount of information available per measurement, because six coordinates unambiguously determine an effector pose. The well-known elementary geometric relationships will not be explained in more detail here.

In the case of the example in FIG. 1, 4*4 laser parameters and 2*6 sensor parameters—and thus an additional 28 parameters in total—had to be identified up to now during each robot calibration in addition to the robot parameters. If, in contrast, the rigid, relative pose of the calibration objects vis-a-vis one another on their carrier units is precisely determined with highly accurate devices, for instance by the manufacturer of the calibration system before the carrier unit is delivered, only the pose of the two carrier units has to be determined for subsequent robot calibrations, requiring 6+6=12 parameters.

The following important features of the invention result from that:

The exact knowledge of the relative poses of the rigidly connected calibration objects provides the following advantages:

- The efficiency of the calibration process is increased or the process is accelerated because fewer calibration measurements are required: Instead of identifying the poses of a number of independent calibration objects relative to one another and to the robot, only the pose of a carrier object (with known calibration objects) has to be identified. The period of time for recalibration after a crash, after wear and tear, after a replacement of the robot or its components is shortened because of that, for instance.
- The resulting mechanism precision increases because fewer parameters have to be identified. The smaller the number of parameters, the less complicated the parameter identification, which requires extremely complex calculations. In particular, all of the mathematical algorithms have a tendency to "smear" unavoidable residual errors over a number of parameters. This effect is dampened by the instant invention.
- Practical advantages also arise during the initial installation of the calibration objects and the initial estimation in that objects that are rigidly connected to a carrier unit are easier to handle than several unconnected objects. In particular, the (re)installation of the calibration system on the robot in the workcell of the user is substantially curtailed because only a few carrier objects have to be transported, set up in a useful way and subjected to initial estimation. The initial estimation is one of the most time-consuming and difficult operations in the (re)calibration.

More information can be obtained per measurement. That increases the efficiency of the calibration process and the resulting mechanism precision as follows:

- Several measurements can be recorded in each measurement pose simultaneously in case that several different operation pairs provide simultaneous signals. In the case of n different operation pairs as in FIG. 1, for instance, a single measurement pose provides the n-fold information in contrast to the earlier situation. The same information as before can therefore be obtained with fewer measurement poses. All of the measurement errors in a given pose can be averaged for each measurement pose. The error averaging and the use of redundancy as in FIG. 1, for instance, make a reduction of the measurement errors possible and this consequently leads to more consistent, more accurate measurement data, which then leads to an increase in the resulting mechanism precision. That is crucial for the mathematical parameter identification.

The initial, one-time, exact determination of the relative poses of the rigidly connected calibration objects increases the efficiency of subsequent (re)calibrations:

- The calibration process becomes more efficient because measurement efforts are saved with every subsequent robot calibration or recalibration of the robot. That is especially crucial for temperature compensation, where in-process calibration has to be performed on a continual basis.
- The resulting mechanism precision increases because increased precision can be obtained easily by investing extraordinary effort into the initial, one-time determination of the relative poses of the rigidly connected calibration objects; e.g. these relative poses may be determined by the calibration system producer with a particularly precise measurement device during their initial, one-time determination. The later mechanism calibrations will provide more precise results because of that.

If only a single operation pair is used for the measurements in accordance with the original technology in [P1], the robot has to make several movements and broad movements to obtain the same information as it obtains in the case of an implementation in accordance with the invention, e.g. in accordance with FIG. 1. Because of the large yield of information per measurement, expansive movements of the mechanism can be eliminated without losses to the resulting pose accuracy with a corresponding optimization of the calibration measurement poses. The reduction of the required free space is important, because space is usually limited in robot workcells.

BRIEF DESCRIPTION OF THE DRAWINGS

Various embodiments of this invention will be described in more detail below with the aid of the drawings. The following are shown in the figures.

DETAILED DESCRIPTION OF THE PREFERRED EMBODIMENTS

Figure 1:
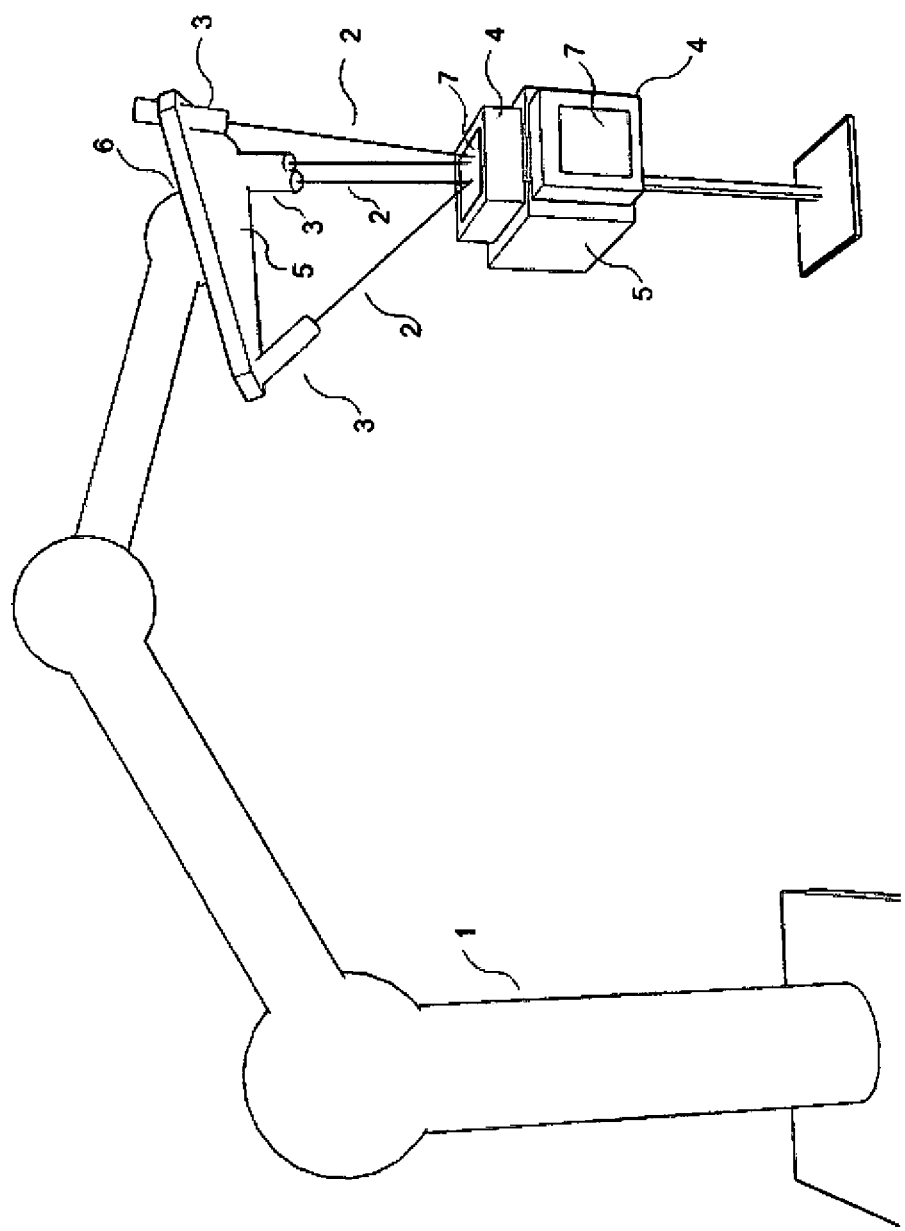
FIG. 1 Arrangement with maximum information per measurement.

FIG. 1 shows an implementation in accordance with the invention with a carrier unit 5 on the effector 6, to which four simple lasers 3 are attached in a rigid pose relative to one another, and a reference object that is comprised of a carrier unit 5 with two rigidly connected sensors 4. There are a total of 4*2=8 different functional operation groups. Four laser-light points are obtained on the light-sensitive surface 7 of the sensor 4 in suitable (calibration) measurement poses of the effector. The amount of effector poses in which all four beams hit a sensor is limited. The prerequisite for successful mechanism calibration, however, is a wide range of the most diverse measurement poses. To combine the requirements for a maximum amount of information per measurement and for a wide range of calibration measurement poses in an optimal fashion, the measurement series are designed in such a way that the sensors are hit by as many laser beams or radiation patters as possible in a few measurement poses, and are hit by fewer beams or by only one laser beam in the most extreme case in other additional measurement poses that result from an optimization of the measurement series. Two laser beams in FIG. 1 are arranged as a rigidly connected pair of parallel beams in one embodiment.

Figure 2:
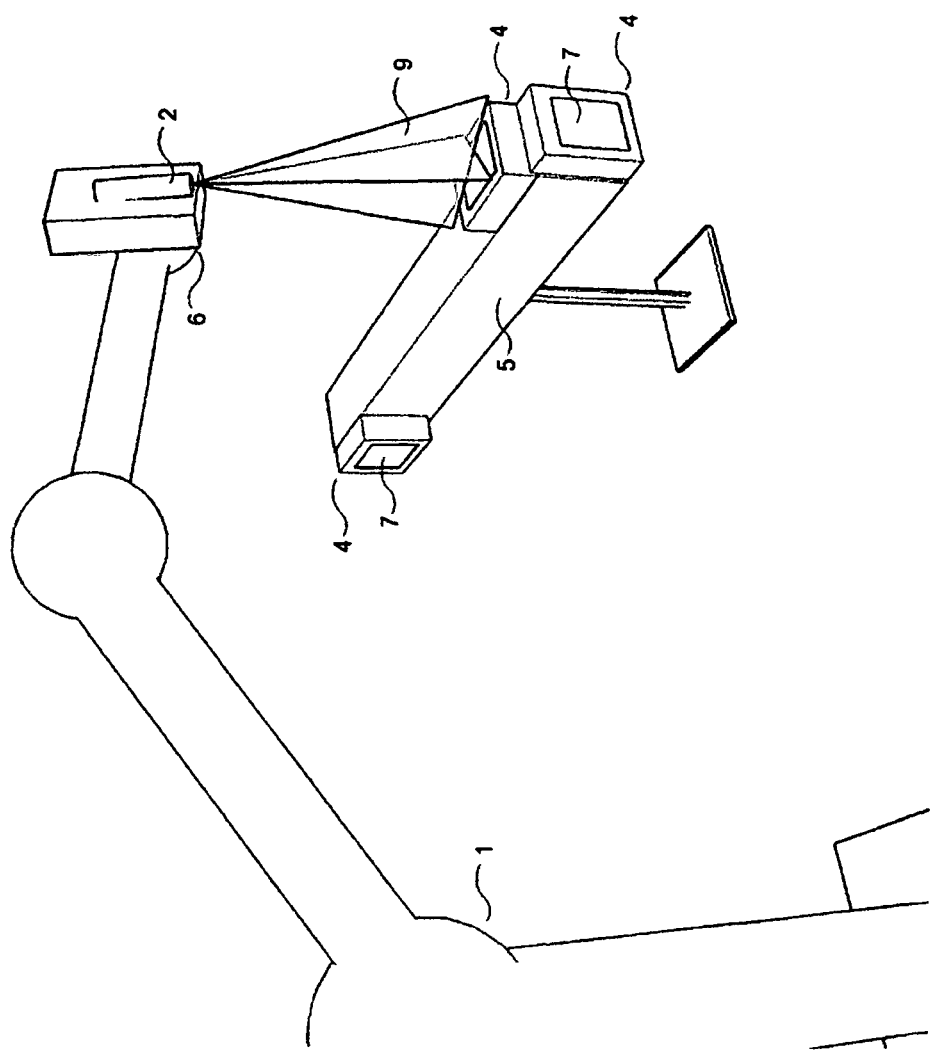
FIG. 2 Standard calibration system for limited requirements with three rigidly combined sensors on a single carrier unit, FIG. 3 Identification of the deviation from linearity in the case of linear joints, FIG. 4 Calibration variant with a stationary laser with splitting optics, and FIG. 5 Initial estimation of heterogeneous calibration object combinations.

The example in FIG. 2 shows an effector laser with a stationary carrier unit 5 with three sensors 4 and cross optics that project a cross-shaped radiation pattern 9 onto sensors. The single carrier unit 5 in the example can be easily transported and quickly installed. If the relative poses of the sensors are precisely measured vis-a-vis one another in advance, the carrier unit is suitable for being a length standard with high error attenuation because of the large spacing between the sensors. Only one sensor is irradiated in each case in all of the measurement poses of the mechanism. The calibration method proposed here and the method in [P1] as well as laser-sensor systems in general do not require the unambiguous reconstruction of the respective pose of the effector or of the effector objects from the measured values that are obtained in one measurement pose. Partial information with regard to the respective effector pose from a single measurement is sufficient for a perfect parameter identification which is obtained from the mathematical evaluation of the totality of all measurements.

Figure 3:
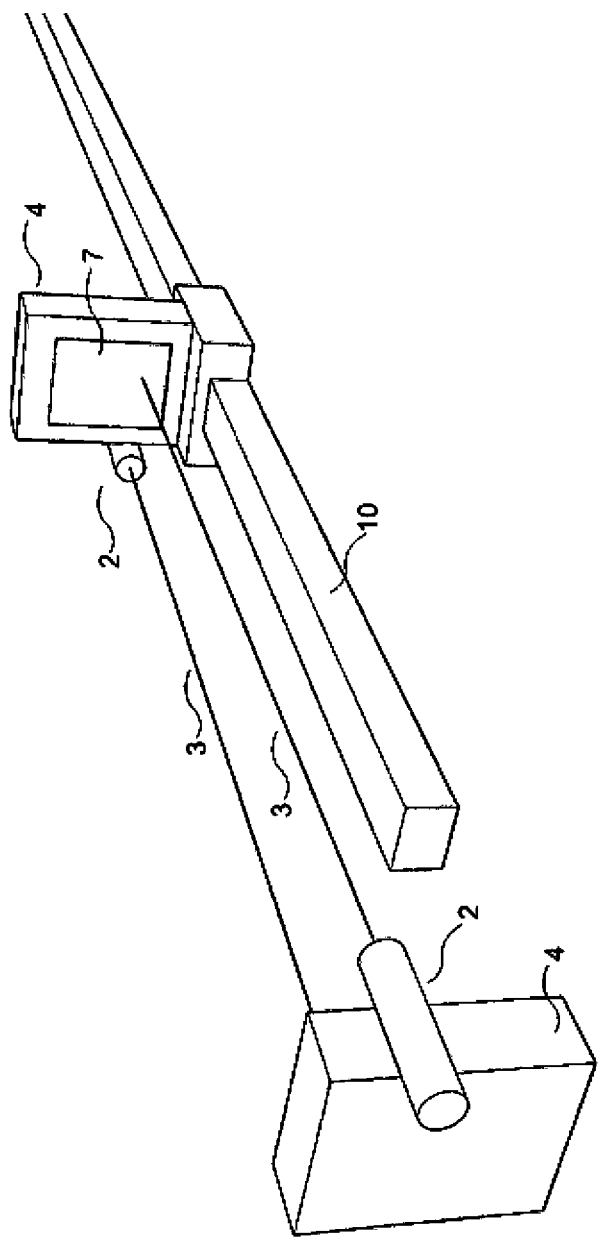

FIG. 3 shows a linear or translational joint 10 that stands in the place of more complex mechanisms with several linear joints, e.g. gantry robots or machine tools. Linear joints have slight deviations from linearity in practice that have to be identified and compensated for. Both effector objects and reference objects in FIG. 3 are rigid combinations of one laser 3 and one sensor 4 each in FIG. 3. For the purpose of more efficient calibration, the lasers as per the figure are aligned in a nearly parallel fashion with the joint axis and the sensors are positioned in such a way that both of them can be hit by the respective laser during the entire joint movement. The information yield is twice as high as in the technology according to [P1]. The maximum information of six equations per measurement can be obtained with a third calibration object pair that is likewise aligned in parallel with the joint.

Figure 4:
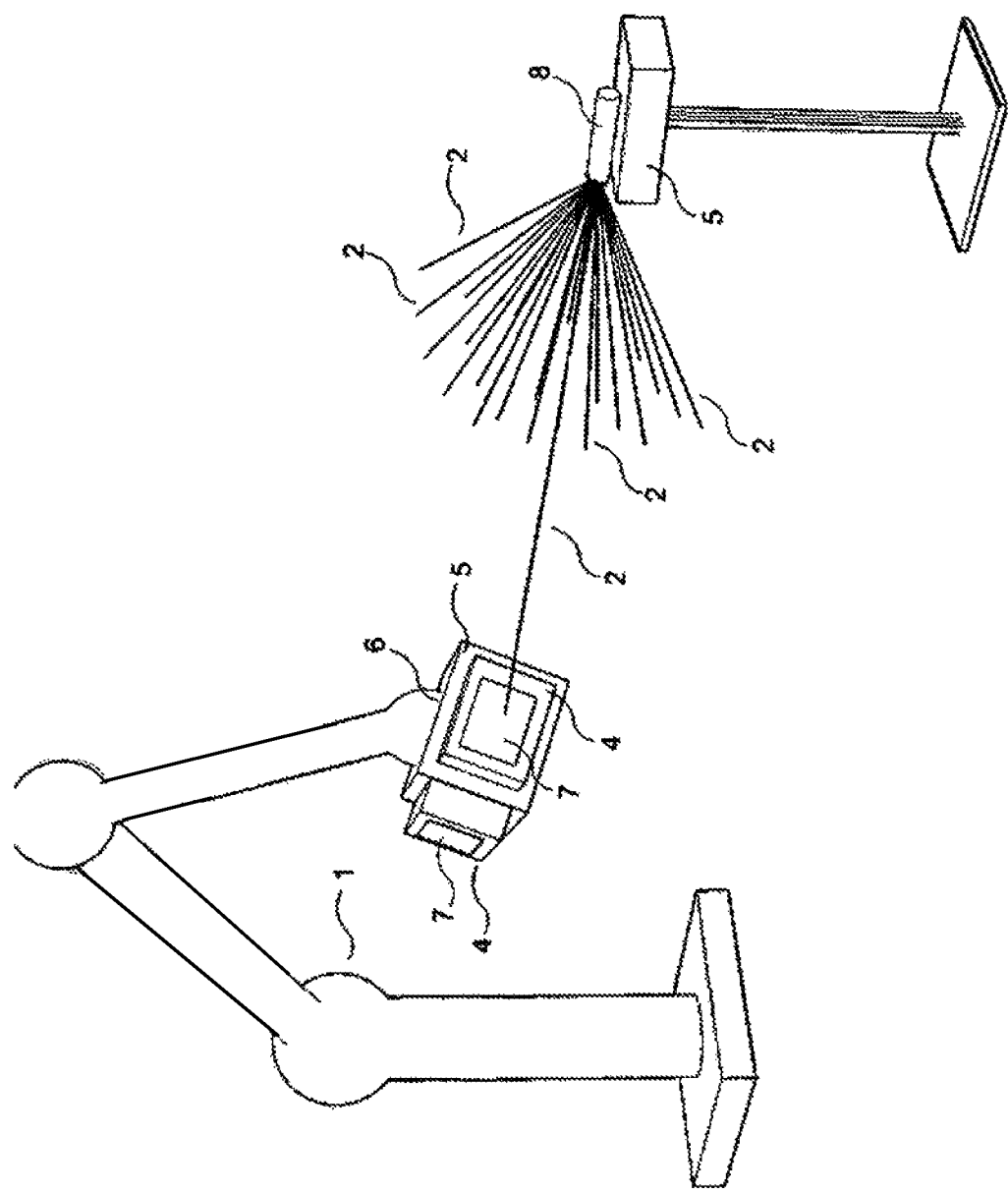

In FIG. 4, a laser with splitting optics 8 that emits several beams 2 at different angles is mounted in a stationary fashion at the edge of the workspace and a carrier unit 5 with two rigidly connected sensors 4 is mounted on the effector 6. An exchange of the effector object and the reference object in this example results in a different calibration variant than the preceding examples with other advantageous characteristics. The two sensors can be simultaneously hit by different beams of the laser in some of the calibration measurement poses.

Figure 5:
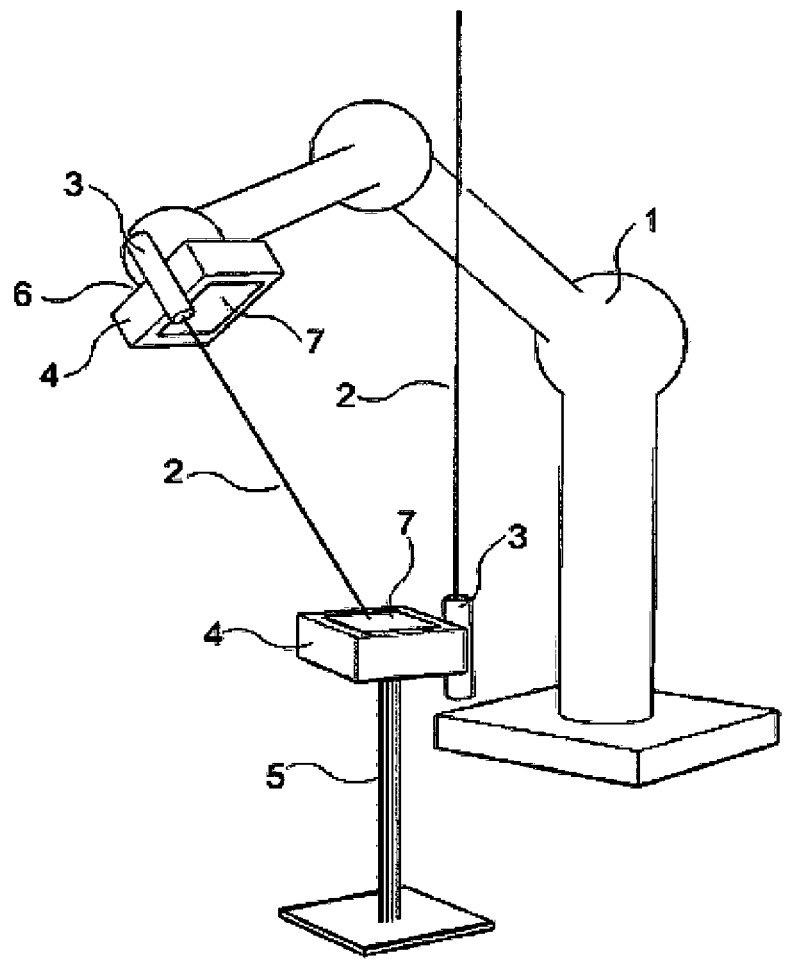

In FIG. 5, a laser 3 is rigidly connected to a sensor 4 in each case, both on the effector 6 and in a stationary fashion in the workspace. Both calibration measurements of the type in FIG. 1 and those of the type in FIG. 4 are possible in this example. Although the measurements are simultaneously taken at the sensors in FIG. 3, that is not the primary goal for the robot with rotary joints in FIG. 5. In this case, the rigid connection above all supports the initial estimation or the initial identification of the pose of the calibration objects, as follows. Let us assume, for instance, that the user puts the reference object 3, 4, 5 in FIG. 5 into the workspace with a position from the laser to the sensor that is precisely measured in advance. As soon as the position of the sensor is determined in the robot coordinate system, the position of the laser that is rigidly connected with it can be calculated immediately afterwards. The poses of the reference objects relative to the robot base, and of the effector objects relative to the effector, have to be determined in an approximate fashion in laser-sensor systems before practical calibration measurement series can be calculated in which the laser really hits the sensor.

BACKGROUND LITERATURE

[Dynalog] see: www.dynalog.com
[Gatla] C. S. Gatla, R. Lumia, J. Wood, G. Starr, An Automated Method to Calibrate Industrial Robots Using a Virtual Closed Kinematic Chain, IEEE TRANSACTIONS ON ROBOTICS, Vol. 23, No. 6 (2007).
[Höllerbach] J. M. Höllerbach, "The Calibration Index and Taxonomy for Robot Kinematic Calibration Methods," Int. J. Robot. Res., Vol. 15, No. 12, pp. 573-591 (1996).
[P1] U.S. Pat. No. 6,529,852 B2, Knoll et al., Method and Device for the Improvement of the Pose Accuracy of Effectors on Mechanisms and for the Measurement of Objects in a Workspace, 2001
[P2] Patent FR 2729236 A1, Thomson Broadband Systems, Robot Positioning in Three-Dimensional Space by Active Lighting, 1995
[P3] Patent Application WO 2010094949 A1, Demopoulos, Measurement of Positional Information for a Robot Arm, 2010
[P4] Patent DE 202005010299 U1, Beyer, Measurement Device for Use with Industrial Robots has Two Cameras Fixed in Given Angular Relationship and Focused on Reference Object, and has Universal Adapter Plate, 2005
[P5] Patent Publication US 020110280472 A1, Liu Lifeng et al., System and Method for Robust Calibration between a Machine Vision System and a Robot, 2010
[Schröer] K. Schröer, Identifikation von Kalibrationsparametern Kinematischer Ketten [Identification of Calibration Parameters of Kinematic Chains]. Hanser Verlag, 1993

LIST OF REFERENCE NUMERALS

1. Robot
2. Radiation pattern (point image)
3. Laser (radiation-pattern generator)
4. Sensor (radiation-pattern position sensor)
5. Carrier unit
6. Effector
7. Light-sensitive sensor surface
8. Laser with splitting optics
9. Radiation pattern (cross-shaped image)
10. Linear joint

The invention claimed is:

1. A system for model-based calibration of a mechanism having a base and at least one segment, said at least one segment being movably connected to the base via at least one joint, said system comprising at least a device and a computing unit, said device comprising at least a first functional operation group and a second functional operation group, wherein the first and second functional operation group each comprise at least one laser emitter, said laser emitter emitting an individual laser beam or a bundle of individual laser beams or any general radiation pattern, and each further comprise at least one sensor, said sensor having a two-dimensional light receiving surface, wherein said sensor and laser emitter are arranged spatially separate from each other, wherein when the sensor and laser emitter and the position and orientation of said mechanism segment are arranged such that said radiation pattern is incident on the light receiving surface of the sensor, a projected radiation pattern is formed on said surface, said sensor further being embodied to monitor the position of said projected radiation pattern on the light receiving surface, wherein said sensor is embodied to transmit such position information to the computing unit, said computing unit being embodied to determine calibration parameters for said model of the mechanism on the basis of said position information, wherein the laser emitter or the sensor of the first functional operation group is arranged on the segment of the mechanism and is rigidly connected to the laser emitter or the sensor of the second functional operational group, and wherein the laser emitter or the sensor of the first and second functional operation groups not arranged on the segment are arranged fixed with respect to the base of the mechanism, wherein either lasers or sensors from two functional operations groups at the segment may be identical or alternatively lasers or sensors not arranged on the segment may be identical, giving a minimum number of all physically different lasers plus all physically different sensors of all functional operation groups which equals at least three.

2. The system according to claim 1, wherein the laser emitter or the sensor of the first functional operation group is arranged rigidly connected via a carrier unit to the laser emitter or the sensor of the second functional operational group.

3. The system according to claim 2, wherein the laser emitter or the sensor of the first functional operation group and the laser emitter or the sensor of the second functional operation group are rigidly connected and fastened to a carrier unit in a predetermined spacing range or a predetermined orientation range relative to one another.

4. The system according to claim 1, wherein the laser emitter of the first functional operation group is arranged on the segment of the mechanism and the sensor or the laser emitter of the second functional operation group is arranged on the segment of the mechanism, and wherein the laser emitter of the first functional operation group and the sensor or the laser emitter of the second functional operation group are rigidly connected together.

5. The system according to claim 1, wherein the sensor of the first functional operation group is arranged at a fixed position with respect to the base of the mechanism and the laser emitter or the sensor of the second functional operation group is arranged at a fixed position with respect to the base of the mechanism, and wherein the sensor of the first functional operation group and the laser emitter or the sensor of the second functional operation group are rigidly connected together.

6. The system according to claim 4 or alternatively claim 5, wherein the exact identification of the relative position and orientation with respect to each other of said rigidly connected laser emitters and said sensors was completed initially, preceding and independent from any calibration or recalibration of said mechanism or other mechanisms.

7. The system according to claim 1, wherein the lasers of the first and second functional operation groups are rigidly connected together, and wherein the angle between the laser beams from said lasers is less than 25 degrees.

8. The system according to claim 1, wherein said projection of said radiation pattern comprises two or more points on the light receiving surface of the sensor of the first functional operational group, on the light receiving surface of the sensor of the second functional operational group, or on the light receiving surfaces of the sensors of the first and second functional operational groups.

9. The system according to claim 1, wherein the projection of said radiation pattern comprises two or more lines on the light receiving surface of the sensor of the first functional operational group, on the light receiving surface of the sensor of the second functional operational group, or on the light receiving surfaces of the sensors of the first and second functional operational groups.

10. The system according to claim 9, wherein the two or more projected lines have at least one intersection.

11. The system according to claim 1, wherein the movable segment is an effector of the mechanism.

12. The system according to claim 1, wherein the mechanism is a robot.

13. A system for calibrating a robot having an effector and a base, wherein the effector is movably attached to the base via at least one joint, wherein the system comprises a computing unit, wherein the system comprises a first laser emitter attached to the effector of the robot and a first sensor having a two-dimensional light receiving surface arranged at fixed position relative to the base, and wherein the system further comprises a second laser emitter rigidly connected to the first sensor and a second sensor having a two-dimensional light receiving surface rigidly connected to the first laser emitter, wherein when the effector is positioned such that laser light from the first and second laser emitters is incident on the light receiving surfaces of the first and second sensors, respectively, the sensors can monitor the respective positions of said laser light on said surfaces and transmit information corresponding to said positions to the computing unit, and wherein said computing unit is embodied to determine calibration parameters on the basis of said position information.

* * * * *